(12) United States Patent
Alvarez et al.

(10) Patent No.: US 7,590,288 B1
(45) Date of Patent: Sep. 15, 2009

(54) METHOD AND/OR APPARATUS FOR DETECTING EDGES OF BLOCKS IN AN IMAGE PROCESSING SYSTEM

(75) Inventors: Jose R. Alvarez, Sunnyvale, CA (US); Huipin Zhang, Santa Clara, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 675 days.

(21) Appl. No.: 11/268,130

(22) Filed: Nov. 7, 2005

(51) Int. Cl.
*G06K 9/48* (2006.01)
*G06K 9/36* (2006.01)
*G06K 9/46* (2006.01)
*G06K 9/00* (2006.01)

(52) U.S. Cl. .................. 382/199; 382/243; 382/166
(58) Field of Classification Search .......... 382/199, 382/243, 266
See application file for complete search history.

(56) References Cited

U.S. PATENT DOCUMENTS

| 5,128,757 A * | 7/1992 | Citta et al. ............ 375/240.01 |
| 6,674,904 B1 * | 1/2004 | McQueen ................... 382/199 |
| 2004/0243012 A1 * | 12/2004 | Ciaccio et al. ............. 600/509 |
| 2007/0216627 A1 * | 9/2007 | Kim et al. .................... 345/92 |

OTHER PUBLICATIONS

F. Pan et al., "Fast Mode Decision for Intra Prediction," Document JVT-G013, Joint Video Team (JVT) of ISO/IEC MPEG & ITU-T VCEG, (ISO/IEC JTC1/SC29/WG11 and ITU-T SG16 Q.6), 7$^{th}$ Meeting: Pattaya II, Thailand, Mar. 7-14, 2003.

F. Pan et al. Fast Intra Mode Decision Algorithm for H.264/AVC Video Coding, pp. 781-784, 2004.

A.M. Bazen, et al. "Systematic Methods for the Computation of the Directional Fields and Singular Points of Fingerprints," IEEE Transactions on Pattern Analysis and Machine Intelligence, vol. 24, pp. 905-919, Jul. 2002.

K.P. Kim et al. Fast Inter Mode Selection, Document JVT-I020, Joint Video Team (JVT) of ISO/IEC MPEG & ITU-VCEG, (ISO/IEC JTC1/SC29/WG11 and ITU-T SG16 Q.6), 9$^{th}$ Meeting: San Diego, U.S., Sep. 2-5, 2003.

* cited by examiner

*Primary Examiner*—Brian P Werner
*Assistant Examiner*—Randolph Chu
(74) *Attorney, Agent, or Firm*—Christopher P. Maiorana, PC

(57) ABSTRACT

An apparatus comprising an edge detector circuit, an edge strength detector and an edge strength threshold circuit. The edge detector circuit may be configured to determine a plurality of default directions of a macroblock in response to a plurality of input signals comprising information about a plurality of samples in the macroblock. The edge strength detector circuit may be configured to generate a maximum strength signal and a next maximum strength signal in response to the default directions. The edge strength threshold circuit may be configured to generate an edge direction signal and an edge strength signal in response to the maximum strength signal and the next maximum strength signal. The edge direction signal may comprise (i) any one of the default directions when in a first state and (ii) any one of a plurality of intermediate directions when in a second state.

16 Claims, 3 Drawing Sheets

US 7,590,288 B1

METHOD AND/OR APPARATUS FOR DETECTING EDGES OF BLOCKS IN AN IMAGE PROCESSING SYSTEM

FIELD OF THE INVENTION

The present invention relates to image processing generally and, more particularly, to a method and/or apparatus for detecting edges of blocks in an image processing system.

BACKGROUND OF THE INVENTION

Conventional block-based image processing and analysis, such as image understanding, segmentation and compression, usually involves detecting the edge direction and the edge strength of a block. In ITU-T H.264/MPEG-4 AVC compliant encoding, the edge direction of a Macro-Block (MB) may provide important information about the prediction direction for intra-frame coding of the block and also for the block partition for inter-frame Motion Estimation (ME) and Motion Compensation (MC).

Several conventional approaches have been used to detect the edge direction of a block. Such approaches usually compute the gradient, the gradient direction and the gradient magnitude (amplitude) at each pixel of the block. The gradient direction at a particular pixel indicates the local edge direction in the neighborhood of the pixel. The gradient magnitude indicates the strength of the edge direction. In a conventional edge direction histogram method, the edge direction of a block is chosen in terms of the histogram of the edge directions of pixels in the block. In a conventional directional field method, the gradient information at the pixels of a block are pooled with two nonlinear spatial collapsing functions, and the quotient of the outcome of the two collapsing functions determines the edge direction of the block. Such approaches both involve pixel-wise nonlinear operations which are very expensive for hardware implementation and some software implementations.

In another conventional approach, the edge strength of a block is usually signified by the sum of the edge magnitude at each pixel of the block. The edge magnitude at a pixel is usually the absolute sum or the square root of the squared sum of the two gradient components at a particular pixel. Since the sum includes magnitudes of edges along all directions, the edge strength is not accurately reflected. Therefore, when used for block homogeneity detection, the edge strength may yield an inaccurate decision. In this context a block with high homogeneity has consistent texture information within its boundaries.

SUMMARY OF THE INVENTION

One aspect of the present invention concerns an apparatus comprising an edge detector circuit, an edge strength detector and an edge strength threshold circuit. The edge detector circuit may be configured to determine a plurality of default directions of a macroblock in response to a plurality of input signals comprising information about a plurality of samples in the macroblock. The edge strength detector circuit may be configured to generate a maximum strength signal and a next maximum strength signal in response to the default directions. The edge strength threshold circuit may be configured to generate an edge direction signal and an edge strength signal in response to the maximum strength signal and the next maximum strength signal. The edge direction signal may comprise (i) any one of the default directions when in a first state and (ii) any one of a plurality of intermediate directions when in a second state.

Another aspect of the present invention concerns a method for detecting edges of a block comprising the steps of (A) determining a plurality of default directions of a macroblock in response to a plurality of input signals comprising information about a plurality of samples in the macroblock, (B) generating a maximum strength signal and a next maximum strength signal in response to the default directions, and (C) generating an edge direction signal and an edge strength signal in response to the maximum strength signal and the next maximum strength signal, wherein the edge direction signal comprises (i) any one of the plurality of default directions when in a first state and (ii) any one of a plurality of intermediate directions when in a second state.

The objects, features and advantages of the present invention include a method and/or apparatus for detecting edges in an image processing system that may (i) allow a system to make effective coding decisions, (ii) be useful in a software only coding decision loop with a hardware accelerator assist and/or (iii) compute intermediate decisions efficiently.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
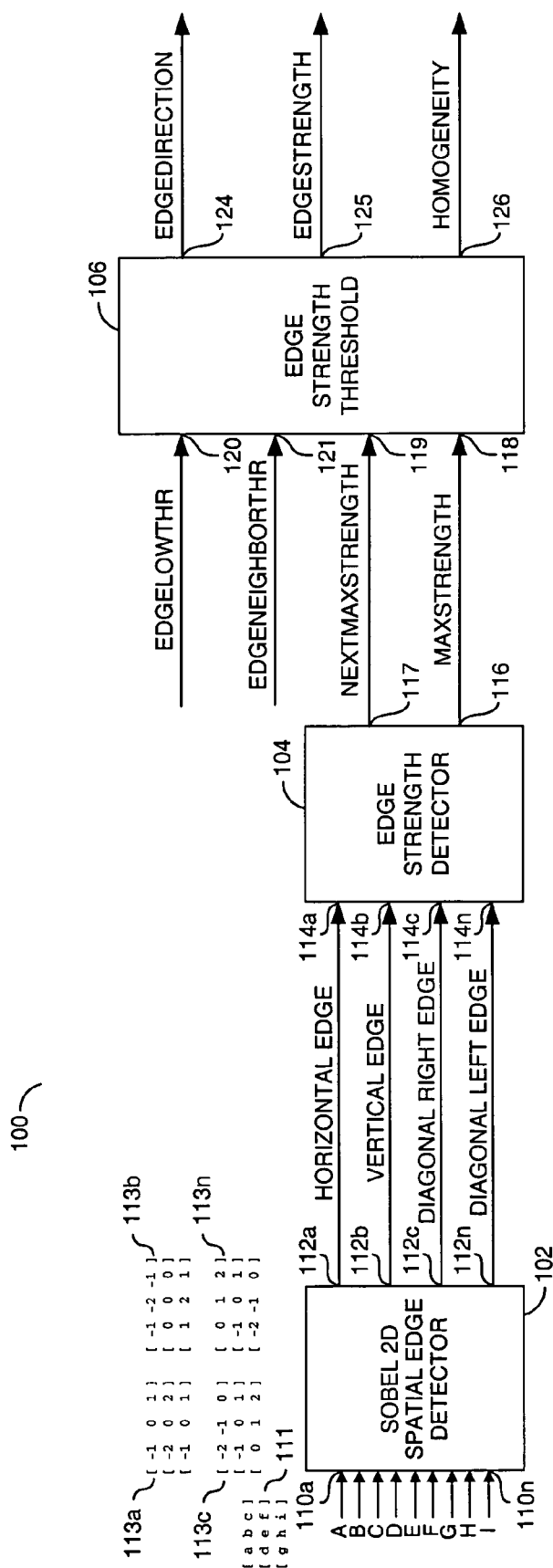
FIG. 1 is a block diagram illustrating a preferred embodiment of the present invention.

Referring to FIG. 1, a block diagram of a system 100 is shown in accordance with a preferred embodiment of the present invention. The system 100 generally comprises a block (or circuit) 102, a block (or circuit) 104 and a block (or circuit) 106. The circuit 102 may be implemented as a spatial edge detector circuit. In one example, the circuit 102 may be implemented as a Sobel 2D spatial edge detector circuit. The circuit 104 may be implemented as an edge strength detector circuit. The circuit 106 may be implemented as an edge strength threshold circuit. The circuit 102 may have a number of inputs 110a-110n that may receive a number of signals A-I. A number of outputs 112a-112n may present a number of output signals. For example, the output 112a may present a signal (e.g., HORIZONTAL_EDGE). The output 112b may present a signal (e.g., VERTICAL_EDGE). The output 112c may present a signal (e.g., DIAGONAL_RIGHTEDGE). The output 112n may present a signal (e.g., DIAGONAL_LEFTEDGE). The circuit 104 may have a number of inputs 114a-114n that may receive the signals from the outputs 112a-112n of the circuit 102. The circuit 104 may also have an output 116 that may present a signal (e.g., MAX_STRENGTH) and an output 117 that may present a signal (e.g., NEXTMAX_STRENGTH).

The circuit 106 may have an input 118 that may receive the signal MAX_STRENGTH, an input 119 that may receive the signal NEXTMAX_STRENGTH, an input 120 that may receive a signal (e.g., EDGELOWTHR) and an input 122 that may receive a signal (e.g., EDGENEIGHBORTHR). The circuit 106 may have an output 124 that may present a signal (e.g., EDGE_DIRECTION) an output 125 that may present a signal (e.g., EDGE_STRENGTH) and an output 126 that may present a signal (e.g., HOMOGENEITY). The signals A-I generally correspond to the rows and columns of a two dimensional input array 111. The two dimensional input array 111 generally comprises spatial samples (e.g., 3×3 pixel values when a first mode) or temporal samples (e.g., 3×3 motion values when in a second mode) The input array may be either frame based (e.g., progressive) or field based (e.g., interlaced). The signals HORIZONTAL_EDGE, VERTICAL_EDGE, DIAGONAL_RIGHTEDGE and DIAGONAL_LEFTEDGE may be default directions.

The system 100 may provide a way to detect the edge direction and the edge strength of a particular block in a number of blocks. The edge detector circuit 102 generally comprises a number of edge detection filters. The edge detection circuit 102 may generate the signals HORIZONTAL_EDGE, VERTICAL_EDGE, DIAGONAL_RIGHTEDGE and DIAGONAL_LEFTEDGE in response to the spatial samples (or pixel location information) or temporal samples (or pixel motion information) on the signals A-I. The system 100 may detect the edge direction and the edge strength of a block based on a gradient field that is generated using a number of edge detection filters. The filters may include a number of kernels 113a-113n that correspond to four spatial orientations (or the default directions). For example, the kernel 113a may correspond to a horizontal orientation, the kernel 113b may correspond to a vertical orientation, the kernel 113c may correspond to a diagonal-down-left orientation, and the kernel 113n may correspond to a diagonal-down-right orientation. The signal HORIZONTAL_EDGE may indicate the amplitude of edges along the horizontal direction. The signal VERTICAL_EDGE may indicate the amplitude of edges along the vertical direction. The signal DIAGONAL_LEFT_EDGE may indicate the amplitude of edges along the diagonal-down-left direction. The signal DIAGONAL_RIGHT_EDGE may indicate the amplitude of edges along the diagonal-down-right direction. The average of the magnitudes (e.g., the absolute values of amplitudes) of an edge direction at each of the pixels within a block may be used to calculate the strength of the edge direction of the block.

The edge strength detection circuit 104 may generate the signal MAX_STRENGTH by comparing and selecting default directions with the largest strength among the signals HORIZONTAL_EDGE, VERTICAL_EDGE, DIAGONAL_LEFT_EDGE and DIAGONAL_RIGHT_EDGE. The edge strength detection circuit 104 may generate the signal NEXTMAX_STRENGTH by selecting the default direction with the next maximum strength among the signals HORIZONTAL_EDGE, VERTICAL_EDGE, DIAGONAL_LEFT_EDGE and DIAGONAL_RIGHT_EDGE. The direction with the strongest edge may be presented on the signal EDGE_DIRECTION as the edge direction of the block. The corresponding direction with the strongest edge may be presented on the signal EDGE_STRENGTH as the edge strength of the block. The signal EDGE_STRENGTH may also provide information about the amount of texture (e.g., signal HOMOGENEITY) of the block. The signal HOMOGENEITY may provide information about the block partition for inter-frame coding.

The edge direction of a block (or the signal EDGE_DIRECTION) may be classified as one of eight directions. The eight directions of the block generally comprise four default directions and four intermediate directions. The four default directions may be defined as the directions which coincide with the four filter directions (or the number of kernels 113a-113n) of the edge detector circuit 102. The intermediate directions may be directions positioned in between the four default directions. The intermediate directions generally comprise the orientations (i) horizontal-up, (ii) horizontal-down, (iii) vertical-left and (iv) vertical right. Each of the intermediate directions may be defined as an average of four pairs of neighboring directions (e.g., horizontal and diagonal-down-right, diagonal-down-right and vertical, vertical and diagonal-down-left, and diagonal-down-left and horizontal, to be described in more detail in connection with FIGS. 2 and 3).

In a first state, the system 100 may present the direction of the strongest edge (e.g., the strongest edge out of the four default directions) on the signal EDGE_DIRECTION on the edge direction of the block. In a second state, the system 100 may also present any one of the intermediate directions as the edge direction of the block on the signal EDGE_DIRECTION. For example, if (i) the strength of the strongest edge among the four default edge directions on the signal MAX_STRENGTH is above the signal EDGELOWTHR, and (ii) the strongest edge direction on the signal MAX_STRENGTH and the next strongest edge direction on the signal NEXTMAX_STRENGTH comprise a pair of neighboring directions, and (iii) the difference between the strengths of the signals MAX_STRENGTH and NEXTMAX_STRENGTH is smaller than the signal EDGE-NEIGHBORTHR. The intermediate direction between the strongest edge (e.g., the signal MAX_STRENGTH) and the second strongest edge direction (e.g., the signal NEXTMAX_STRENGTH) generally corresponds to the edge direction of the block. The average of the strengths between the strongest two edge directions on the signals MAX_STRENGTH and NEXTMAX_STRENGTH generally corresponds to the strength of the edge direction of the block.

A typical application of the present invention may be the intra-frame prediction and inter-frame variable block-size motion estimation (ME) and motion compensation (MC) in ITU-T H.264/MPEG-4 AVC. The edge direction of a macroblock (MB) may be taken as the sole intra-prediction direction. The edge strength of the MB may determine whether (i) some block partitions may be eliminated and (ii) the edge direction of the MB determines which partitions may be eliminated in ME and MC.

Both spatial and temporal Luma edges may be computed for each macroblock. The spatial and temporal Luma edges may be derived from the edge detection circuit 102. The system 100 may use four different Sobel edge detection operators to compute the strongest average direction for every macroblock. While four edge detection operations have been described, more operations may be implemented to meet the design criteria of a particular implementation.

Figure 2:
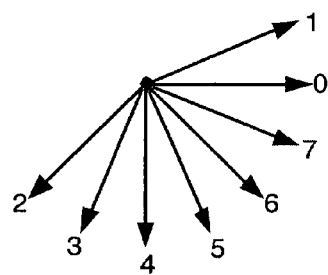
FIG. 2 is a diagram illustrating edge directions.

Referring to FIG. 2, a diagram illustrating Sobel directions is shown. The edge directions generally comprise the four default directions (or Sobel directions) (e.g., 0, 2, 4 and 6) and the intermediate directions (e.g., 1, 3, 5, 7).

Figure 3:
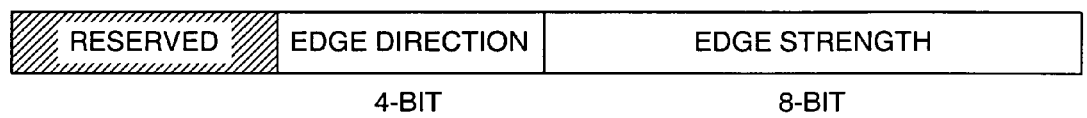
FIG. 3 is a diagram illustrating edge information.

Referring to FIG. 3, a diagram illustrating an example of an edge information word is shown. In the example illustrated, the edge information word comprises a number of reserved bits, the signal EDGE_DIRECTION and the signal EDGE_STRENGTH. The signal EDGE_DIRECTION may be implemented as a 4-bit value (e.g., b3b2b1b0). The signal EDGE_STRENGTH may be implemented as an 8-bit value. However, other bit-widths of the signal EDGE_DIRECTION and the signal EDGE_STRENGTH may be implemented to meet the design criteria of a particular implementation.

Each edge direction on the signal EDGE_DIRECTION may be represented by the lower 3-bits (e.g., b2b1b0) of the 4-bit value. When a strong direction is not detected (as determined by the signal EDGELOWTHR), the upper bit (b3) of the 4-bit value may be set to '1'. The system 100 may present the edge direction along with the edge strength. If the direction value is greater than 8 (or if b3=1), the macroblock may be 'homogeneous' and the signal HOMOGENEITY may be active to indicate that the block is homogeneous. If the value of the signal EDGENEIGHBORTHR is set to '0', any one of the even default directions (0, 2, 4, 6) may be reported by the system 100.

Figure 4:
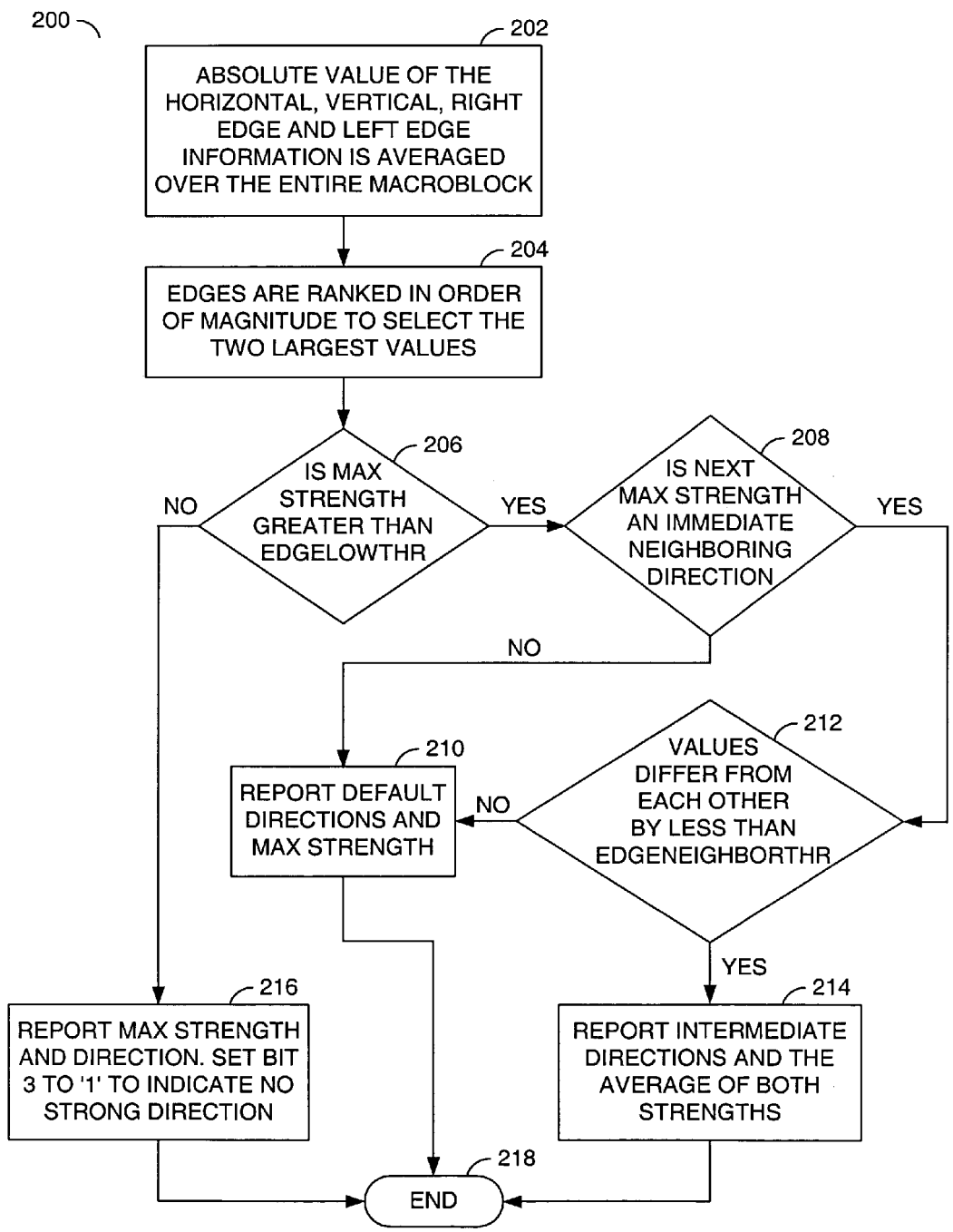
FIG. 4 is a flow diagram of a process of the present invention.

Referring to FIG. 4, a flow diagram of a process 200 is shown in accordance with the present invention. The process 200 may obtain edges for a macroblock. The process 200 generally comprises a state 202, a state 204, a decision state 206, a decision state 208, a state 210, a decision state 212, a state 214, a state 216, and a state 218. The state 202 may average an absolute value of a horizontal, vertical, right and left edges over an entire macroblock. The strength of each default direction is the average value over the macroblock and may be defined by the following equations:

$$HorzEdgeStrength = \frac{1}{N^2}\sum_{i=0}^{N-1}\sum_{j=0}^{N-1} |HorzSobel_{ij}| \quad \text{EQ. 1}$$

$$VertEdgeStrength = \frac{1}{N^2}\sum_{i=0}^{N-1}\sum_{j=0}^{N-1} |VertSobel_{ij}| \quad \text{EQ. 2}$$

$$DiagRightEdgeStrength = \frac{1}{N^2}\sum_{i=0}^{N-1}\sum_{j=0}^{N-1} |DiagRightSobel_{ij}| \quad \text{EQ. 3}$$

$$DiagLeftEdgeStrength = \frac{1}{N^2}\sum_{i=0}^{N-1}\sum_{j=0}^{N-1} |DiagLeftSobel_{ij}| \quad \text{EQ. 4}$$

The state 204 may be used to rank the edges in an order of magnitude in order to select the two largest values. The default direction with the largest value or strength may be presented on the signal MAX_STRENGTH. The default direction with the next largest value or strength may be presented on the signal NEXTMAX_STRENGTH. The decision state 206 determines if the signal MAX_STRENGTH is greater than the signal EDGELOWTHR. If the signal MAX_STRENGTH is smaller than the signal EDGELOWTHR, the method 200 moves to the state 216. The state 216 reports the maximum strength of the block and the direction of the block. The state 216 also sets b3 to '1' to indicate that no strong directional information is present (e.g., homogeneous). A homogeneous block may also be referred to as a low texture block. The process 200 moves to the end state 216. If the signal MAX_STRENGTH is greater than the signal EDGELOWTHR, the method 200 moves to the state 208. The state 208 determines if the default direction with the next maximum strength is an immediate neighboring direction to the edge direction with the maximum strength. The following TABLE 1 illustrates the immediate neighboring directions which correspond to default block directions:

TABLE 1

| BLOCK DIRECTION | NEIGHBORING DIRECTIONS |
|---|---|
| 0 | 6, 2 |
| 2 | 0, 4 |
| 4 | 2, 6 |
| 6 | 4, 0 |

If the state 208 determines that the default direction with the next maximum strength is an immediate neighboring direction to the default direction with the maximum strength, the method 200 moves to the state 212. If not, the method 200 moves to the state 210. The state 210 reports any one of the default directions (0, 2, 4, 6) as (i) the edge direction of the block on the signal EDGE_DIRECTION and (ii) the strength of the edge direction of the block on the signal EDGE_STRENGTH. The state 212 determines if the difference between the default direction with the maximum strength and the default direction with the next maximum strength differ from each other by less than an amount equal to the signal EDGENEIGHBORTHR. If so, the method 200 moves to a state 214. The state 214 reports any one of the intermediate directions (1, 3, 5 or 7) on the signal EDGE_DIRECTION and the average strength between the default direction with the maximum strength and the default direction with the next maximum strength on the signal EDGE_STRENGTH. The method 200 moves to the state 218. If the difference between default direction with the maximum strength and default direction with the next maximum strength is not less than the signal EDGENEIGHBORTHR, the method 200 moves to the state 216. The state 210 reports any one of the default directions (0, 2, 4, 6) as (i) the edge direction of the block on the signal EDGE_DIRECTION and (ii) the strength of the edge direction of the block on the signal EDGE_STRENGTH.

The system 100 may assume that when the default direction is not strong enough (e.g., less than or equal to signal EDGELOWTHR) only the main sobel direction may be reported with the signal HOMOGENEITY being set to 1 to indicate that the block is homogeneous. The information reported regarding spatial and temporal edges comprises the 4-bit value for the edge direction and the 8-bit value for the edge strength. The edge strength value on the signal EDGE_STRENGTH may correspond to the strongest direction or to the average of the two adjacent strongest directions.

Conventional approaches use edge detection on a pixel basis with an emphasis on horizontal and vertical direction. The intermediate directions in those approaches are computed via transcendental or trigonometric functions. Specific directions are assigned for each pixel and classified on a pixel basis.

The present invention may (i) use separate operators for the four default directions, (ii) compute the strength of each direction for the block and (iii) compare the edge strengths to make decisions as to the direction of the block. The edge directions provided by the system 100 may be sufficient to allow coding decisions to be made. The edge directions may be useful in a software-only coding decision loop (e.g., with a hardware accelerator assist). However, the present invention may be capable of computing intermediate directions efficiently.

Intermediate directions may be computed from the default directions instead of computing all of the directions at the pixel level. Each pixel may be categorized four times during a block averaging operation rather than eight times as in conventional approaches. In general, only block averages may be used since the block averages may be relevant data in coding decisions (e.g., the individual pixel edge data is not used directly in obtaining data for the coding decisions).

The present invention may provide for reduced processing by deriving all decisions from separate average macroblock directions. Conventional methods use individual directions at each pixel to make coding decisions. Such conventional methods make coding decisions regarding direction/strength/homogeneity on a pixel based format. In contrast, the present invention makes coding decisions based on macroblock averages. Making coding decisions based on macroblock averages reduces processing and provides better results since the decisions regarding direction/strength/homogeneity are based on a number of pixels and not single elements. Furthermore, since encoder decisions are also made on a macroblock basis, there may be no need for more accuracy.

The advantage with the present invention is that once the block data is derived, the data set may be reduced drastically and therefore processed more efficiently. Furthermore, the present invention may be used to aid in determining macroblock adaptive field frame (MBAFF) coding decisions when coupled with vertical texture information, motion edge and motion detected per MB.

The present invention may allow the detection of block edge information early in the compression process video pre processor (e.g., VPP). The block edge information may be used for multiple purposes. Edge information may be used as statistics to determine areas in the original picture for special coding. Edge information may be used to determine MBAFF decisions ahead of time. Edge information may be used to improve intra and inter mode selection during encoding. The present invention may save hardware, improve performance, and provide easier firmware control (at the block level and not the pixel level). In one example, the present invention may be implemented in a system as described in co-pending application Ser. No. 11/232,459, which is hereby incorporated by reference in its entirety.

With any encoding technique that affects coding selection, the system may be monitored by inferring use from encoded bit streams. Creating specific image patterns with strong diagonal edges and monitoring intra prediction modes and inter mode selection patterns may assist detection. The present invention may allow for easier detection since a homogeneity component is associated with the edge detection. Certain MBs may be detected as homogeneous even though there may be edges in the picture content. Even with edges in the picture content coding selection may be improved on the premise that it may be better to code a homogeneous block well rather than a block with multiple edges poorly.

The present invention may use linear operations to classify the edge direction of the block. The linear operation may be efficient for hardware implementation. The edge direction classification may be performed at the block level, which allows the detection to be more accurate and robust. The edge strength may be more accurate since it only includes the magnitude of pixel-level edges of the same direction.

Any present and future coding techniques may (i) derive benefits from properly identifying edges in the picture and (ii) classify the edges in the blocks that may be easier to process and are better suited to block-based coding techniques.

The function performed by the flow diagram of FIG. 4 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMS, EPROMs, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   an edge detector circuit configured to determine a plurality of default directions of a macroblock in response to a plurality of input signals comprising information about a plurality of samples in said macroblock;
   an edge strength detector circuit configured to generate a maximum strength signal and a next maximum strength signal in response to said default directions; and
   an edge strength threshold circuit configured to generate an edge direction signal and an edge strength signal in response to said maximum strength signal and said next maximum strength signal, wherein said edge direction signal comprises (i) any one of said plurality of default directions when in a first state and (ii) any one of a plurality of intermediate directions when in a second state, wherein said edge strength threshold circuit is configured to (i) determine whether said default direction with the largest maximum strength is an immediate neighboring direction to said default direction with the next largest maximum strength and (ii) report any one of said intermediate directions on said edge direction signal as the edge direction of a block if the difference between said default direction with the largest maximum strength and the and the default direction with the next largest maximum strength is less than an edge neighbor threshold signal.

2. The apparatus according to claim 1, wherein said information about said plurality of samples comprises (i) location information when in a first mode and (ii) direction information when in a second mode.

3. The apparatus according to claim 2, wherein said apparatus (i) processes pixels when in said first mode and (ii) processes temporal information when in said second mode.

4. The apparatus according to claim 1, wherein said edge strength threshold circuit is configured to generate a homogeneity signal based on a status of said edge direction signal.

5. The apparatus according to claim 1, wherein said edge strength detector circuit is configured to calculate a strength for each of said default directions.

6. The apparatus according to claim 3, wherein said edge strength detector circuit is configured to calculate the strength for each of said default directions by calculating an average of the absolute value of each of said default directions over said macroblock.

7. The apparatus according to claim 6, wherein said maximum strength signal comprises the largest maximum strength calculated among said default directions.

8. The apparatus according to claim 7, wherein said next maximum strength signal comprises the next largest maximum strength calculated among said default directions.

9. The apparatus according to claim 8, wherein said edge strength threshold circuit is configured to compare said maximum strength signal to an edge low threshold signal.

10. The apparatus according to claim 1, wherein said edge strength threshold circuit is configured to report said default direction with the largest maximum strength on said edge direction signal if the difference between said default direction with the largest maximum strength and the default direction with the next largest maximum strength is greater than said edge neighbor threshold signal.

11. An apparatus comprising:
    means for determining a plurality of default directions of a macroblock in response to a plurality of input signals comprising information about a plurality of samples in said macroblock;
    means for generating a maximum strength signal and a next maximum strength signal in response to said default directions; and
    means for generating an edge direction signal and an edge strength signal in response to said maximum strength signal and said next maximum strength signal, wherein said edge direction signal comprises (i) any one of said plurality of default directions when in a first state and (ii) any one of a plurality of intermediate directions when in a second state, wherein said means for generating said edge direction signal (i) determines whether said default direction with the largest maximum strength is an immediate neighboring direction to said default direction with the next largest maximum strength and (ii) reports any one of said intermediate directions on said edge direction signal as the edge direction of a block if the difference between said default direction with the largest maximum strength and the default direction with the next largest maximum strength is less than an edge neighbor threshold signal.

12. A method for detecting edges of a block comprising the steps of:
    (A) determining a plurality of default directions of a macroblock in response to a plurality of input signals comprising information about a plurality of samples in said macroblock;
    (B) generating a maximum strength signal and a next maximum strength signal in response to said default directions; and
    (C) using an edge strength threshold circuit for generating an edge direction signal and an edge strength signal in response to said maximum strength signal and said next maximum strength signal, wherein said edge direction signal comprises (i) any one of said plurality of default directions when in a first state and (ii) any one of a plurality of intermediate directions when in a second state, wherein step (C) (i) determines whether said default direction with the largest maximum strength is an immediate neighboring direction to said default direction with the next largest maximum strength and (ii) reports any one of said intermediate directions on said edge direction signal as the edge direction of a block if the difference between said default direction with the largest maximum strength and the default direction with the next largest maximum strength is less than an edge neighbor threshold signal.

13. The method according to claim 12, further comprising the steps of:
    calculating a strength for each of said default directions; and
    calculating an average of the absolute value of each of said default directions over an entire macroblock.

14. The method according to claim 12, wherein (i) said maximum strength signal comprises the largest maximum strength calculated among said default directions and (ii) said next maximum strength signal comprises the next largest maximum strength calculated among said default directions.

15. The method according to claim 13, further comprising the step of:
    comparing said maximum strength signal to an edge low threshold signal.

16. The method according to claim 12, further comprising the step of:
    reporting any one of said default direction on said edge direction signal as the edge direction of said block if the difference between said default direction with the largest maximum strength and the default direction with the next largest maximum strength is greater than said edge neighbor threshold signal.

\* \* \* \* \*